(12) United States Patent
Brunson et al.

(10) Patent No.: US 6,606,931 B1
(45) Date of Patent: Aug. 19, 2003

(54) BEVEL LOCKING SYSTEM FOR A SLIDING COMPOUND MITER SAW

(75) Inventors: Mark E. Brunson, Abingdon, MD (US); William R. Stumpf, Kingsville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/167,301

(22) Filed: Oct. 6, 1998

Related U.S. Application Data (62) Division of application No. 08/761,730, filed on Dec. 5, 1996.
(60) Provisional application No. 60/008,512, filed on Dec. 12, 1995.

(51) Int. Cl.[7] ................................................. B27B 5/29
(52) U.S. Cl. ........................ 83/471.3; 83/473; 83/477.1; 83/581
(58) Field of Search .......................... 83/471.3, 473, 83/581, 699.51, 471, 471.2, 477.1, 477.2, 477, 485

(56) References Cited

U.S. PATENT DOCUMENTS

| | | | | |
|---|---|---|---|---|
| 1,030,229 A | * | 6/1912 | Cheney | |
| 1,332,881 A | * | 3/1920 | Bommer | |
| 1,644,887 A | * | 10/1927 | Mansfield | 83/471.3 |
| 1,646,589 A | * | 10/1927 | Mek et al. | |
| 3,821,918 A | * | 7/1974 | Niehaus et al. | 83/471.3 |
| 4,152,961 A | * | 5/1979 | Batson | |
| 4,221,051 A | * | 9/1980 | Glass | |
| 4,452,117 A | * | 6/1984 | Brickner et al. | |
| 4,537,105 A | * | 8/1985 | Bergler | |
| 4,658,681 A | * | 4/1987 | Pollak et al. | |
| 4,804,170 A | * | 2/1989 | Young et al. | |
| 4,869,142 A | * | 9/1989 | Sato et al. | |
| 4,934,233 A | * | 6/1990 | Brundage et al. | |
| 5,054,352 A | * | 10/1991 | Fushiya et al. | 83/471.3 |
| 5,060,548 A | * | 10/1991 | Sato et al. | 83/471.3 |
| 5,063,805 A | * | 11/1991 | Brundage | 83/468.3 |
| 5,146,826 A | * | 9/1992 | Shiotani et al. | 83/471.3 |
| 5,216,964 A | * | 6/1993 | Sato et al. | |
| 5,235,889 A | * | 8/1993 | Brickner et al. | |
| 5,249,496 A | * | 10/1993 | Hirsch et al. | 83/471.3 |
| 5,257,570 A | * | 11/1993 | Shiotani et al. | |
| 5,392,678 A | * | 2/1995 | Sasaki et al. | 83/471.3 |
| 5,404,779 A | * | 4/1995 | Break | 83/471.3 |
| 5,425,294 A | * | 6/1995 | Ushiwata et al. | 83/471.3 |
| 5,437,214 A | * | 8/1995 | Sasaki et al. | |
| 5,582,089 A | * | 12/1996 | Sasaki et al. | 83/471.3 |
| 5,660,094 A | * | 8/1997 | Sasaki et al. | 83/471.3 |
| 5,823,085 A | | 10/1998 | Kondo et al. | |

FOREIGN PATENT DOCUMENTS

| | | | |
|---|---|---|---|
| DE | 7911915 | * | 7/1979 |
| DE | 2929932 | * | 2/1980 |
| DE | 3640784 | * | 3/1988 |
| DE | 3040500 | * | 1/1989 |
| DE | 8900108.7 | * | 3/1989 |
| DE | 3744716 | * | 12/1990 |
| DE | 3737814 | * | 1/1991 |
| DE | 3813852 | * | 4/1992 |
| EP | 0570904 | * | 11/1993 |
| EP | 0585841 | * | 3/1994 |

* cited by examiner

Primary Examiner—M. Rachuba
(74) Attorney, Agent, or Firm—Harness, Dickey & Pierce, P.L.C.

(57) ABSTRACT

A compound miter saw has a unique locking system for locking the bevel angle support housing to the table assembly once the desired bevel angle has been set. The locking system includes a cam and a handle each with an angular cam surface. When the two cam surfaces are aligned, the support housing is free to pivot around a supporting shaft. When the handle is rotated on the shaft, the two cam surfaces are moved to a non-aligned position. This non-alignment of cam surfaces causes axial movement of the cam along the shaft which in turn forces the support housing against the table assembly to lock the support housing in the desired bevel angle.

23 Claims, 5 Drawing Sheets

BEVEL LOCKING SYSTEM FOR A SLIDING COMPOUND MITER SAW

This is a division of U.S. patent application Ser. No. 08/761,730, filed Dec. 5, 1996, this application also claims the benefit of provisional application No. 60/008,512 filed Dec. 12, 1995.

FIELD OF THE INVENTION

The present invention relates to compound miter saws or other power operated equipment or machinery utilizing a cutter for performing working operations on a workpiece. More particularly, the present invention relates to improvements in the locking mechanism for the bevel adjustment for such power operated equipment, with the locking mechanism having an adjustable cam lock arrangement for locking the bevel pivot/support housing to the table at any desired bevel angle.

BACKGROUND OF THE INVENTION

Saws and other apparatuses designed for cutting or performing other working operations on a workpiece typically require adjustment mechanisms for moving the saw blade or cutting tool into an angular relationship to the workpiece. Examples of such equipment include crosscut compound miter saws which are adapted for allowing the user to selectively move the saw blade into any of a number of positions or modes for square cutting, miter cutting, bevel cutting, or compound miter cutting where a combination miter angle and bevel angle are cut. In addition, some operations, such as dado cutting or shaping operations, for example, require the use of saw blades or other cutting or working devices of different shapes or sizes to be substituted for one another in order to perform the desired operation on the workpiece, whether the workpiece is composed of wood, plastic, metal other materials.

In order to allow for the adjustment in the miter and the bevel angle, the saw blade, cutter or other working device is angularly adjustable with respect to a horizontal base and a vertical fence against which the workpiece is positioned. The miter adjustment allows the saw blade, cutter or other working device to move angularly with respect to the vertical fence while maintaining perpendicularity with the horizontal base. The bevel adjustment allows the saw blade, cutter or other working device to move angularly with respect to the horizontal base while maintaining perpendicularity with the vertical fence. At times it may be desirable to cut a combination miter angle and bevel angle by simultaneously adjusting the angularity of the blade with respect to both the horizontal base and the vertical fence.

Once the saw blade, cutter or other working device has been adjusted to the desired position with respect to the horizontal base and the vertical fence, locking mechanisms for the miter and bevel adjustment must be activated in order to prohibit movement of the saw blade, cutter or other working device with respect to the base and fence while the cutting operation is performed. These locking mechanisms need to be easily activated, adjustable and quick acting in order to optimize the efficiency of the cutting apparatus and provide convenience to the operator of the apparatus.

SUMMARY OF THE INVENTION

In accordance with the present invention, an improved bevel locking mechanism is employed. The locking mechanism includes a base or table assembly having an axially extending locking rod and a bevel support housing disposed on the locking rod such that the housing can move axially along the rod as well as pivot on the rod. The axial movement permits the locking of the housing to the base and the pivoting movement permits the desired adjustment to the bevel angle. A cam is positioned on the rod adjacent to the housing such that it can move axially on the rod but it is not allowed to rotate with respect to the rod. The double cam includes an angular cam surface which abuts a second angular cam surface located on a locking handle. The locking handle is positioned on the rod adjacent the cam such that it cannot move axially on the rod in a direction away from the cam but it is free to rotate with respect to the rod.

When the two cam surfaces are aligned, the support housing can be pivoted on the rod in order to adjust the bevel angle. Once the desired bevel angle has been attained, the locking handle is rotated on the rod mis-aligning the two camming surfaces resulting in the axial movement of the support housing into engagement with the base or table assembly, locking the support housing to the base. The adjustment to the locking mechanism is achieved by rotating a locknut which axially locates and secures the various components on the locking rod.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Referring now to the drawings in which like reference numerals designate like or corresponding parts throughout the several views, there is shown in FIGS. 1 through 4 an exemplary sliding compound miter saw incorporating a cam locking mechanism according to the present invention, shown merely for the purposes of illustration, and designated generally by the reference numeral 10. One skilled in the art will readily recognize from the following description, taken in conjunction with the accompanying drawings and claims, that the principles of the present invention are equally applicable to sliding compound miter saws, compound miter saws, chop saws, radial arm saws, table saws or other saws of types other than that shown for purposes of illustration in the drawings. Similarly, one skilled in the art will readily recognize that the principles of the cam locking mechanism according to the present invention are also applicable to other types of powered or unpowered equipment for performing an operation on a workpiece. Such equipment includes, but is not limited to, dado saws, spindle shapers or sanders, or other types of powered or unpowered devices that would benefit from the cam locking mechanism of the present invention.

Referring primarily to FIGS. 1 through 4, sliding compound miter saw 10 comprises a base assembly 12, a table assembly 14, a unique housing assembly 16, a saw blade 18, a blade guard 20, a motor 22 drivingly connected to saw blade 18, a handle 24 and a fence assembly 26. Table assembly 14 is secured to base assembly 12 such that it can be rotated in order to provide adjustment for miter cutting. The rotation of table assembly 14 changes the angle of saw blade 18 relative to fence assembly 26 but maintains the perpendicularity of saw blade 18 with table assembly 14. A locking mechanism 28 can be activated in order to lock table assembly 14 to base assembly 12.

Housing assembly 16 is secured to table assembly 14 such that it can be pivoted with respect to table assembly 14 in order to provide adjustment for bevel cutting. As can be appreciated by one skilled in the art, the adjustments for mitering and beveling can be separate or they can be adjusted simultaneously in order to provide a compound miter and bevel cut. The pivoting of housing assembly 16 changes the angle of saw blade 18 relative to table assembly 14 but maintains the perpendicularity of saw blade 18 with respect fence assembly 26. A locking mechanism 30 can be activated in order to lock housing assembly 16 to table assembly 14.

Referring to FIGS. 1 through 5, the present invention is directed towards housing assembly 16 and locking mechanism 30 which locks housing assembly 16 to table assembly 14 at any desired bevel angle. Housing assembly 16 includes support housing 32, which mounts a pair of support arms 34 for sliding movement with respect to housing 32. Saw blade 18, blade guard 20, motor 22 and handle 24 are all mounted to a drive housing 36 which is pivotably secured to support arms 34. The pivoting of drive housing 36 downward towards table assembly 14 operates to open blade guard 20 and cut a workpiece which is supported by table assembly 14 and fence assembly 26. The sliding movement of support arm 34 relative to housing 32 permits drive housing 36 and thus saw blade 18 to be pulled through the workpiece when the size of the workpiece exceeds the cutting width of saw blade 18.

Referring now to FIGS. 5 through 8, support housing 32 is pivotably supported with respect to table assembly 14 on a steel shaft 40 which is secured to table assembly 14 and extends rearwardly from table assembly 14 to define a pivot axis 42 for support housing 32. Shaft 40 is inserted into a complimentary bore 44 located within table assembly 14 and is secured in place using a cross pin 46 which extends through a bore 47 extending through shaft 40 and a corresponding set of bores 48 located within table assembly 14 and being generally perpendicular to and extending into bore 44. The end of shaft 40 opposite to the end defining bore 46 includes a threaded stub 50 for retaining and adjusting locking mechanism 30 as will be described later herein.

Figure 1:
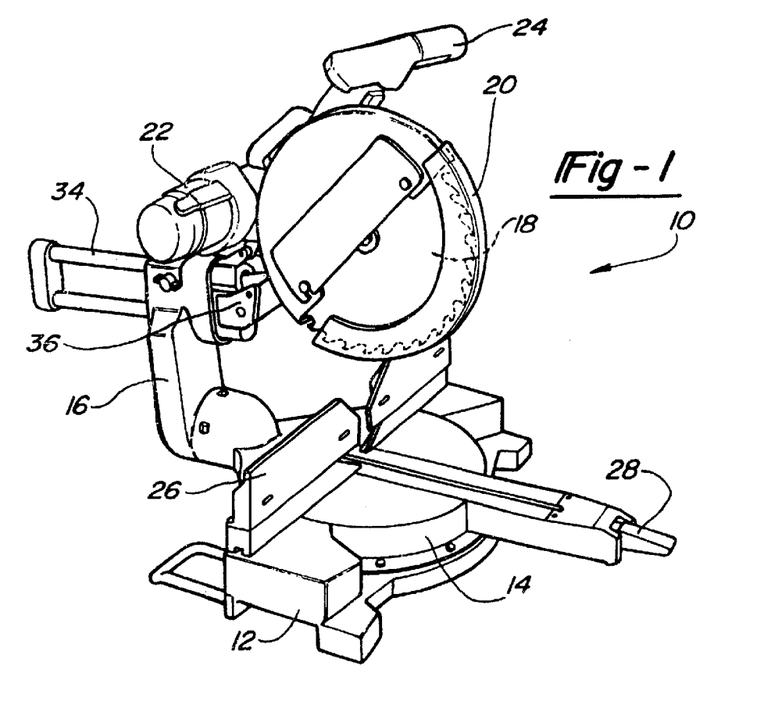
FIG. 1 is a front perspective view of a sliding compound miter saw in accordance with the present invention.
Figure 2:
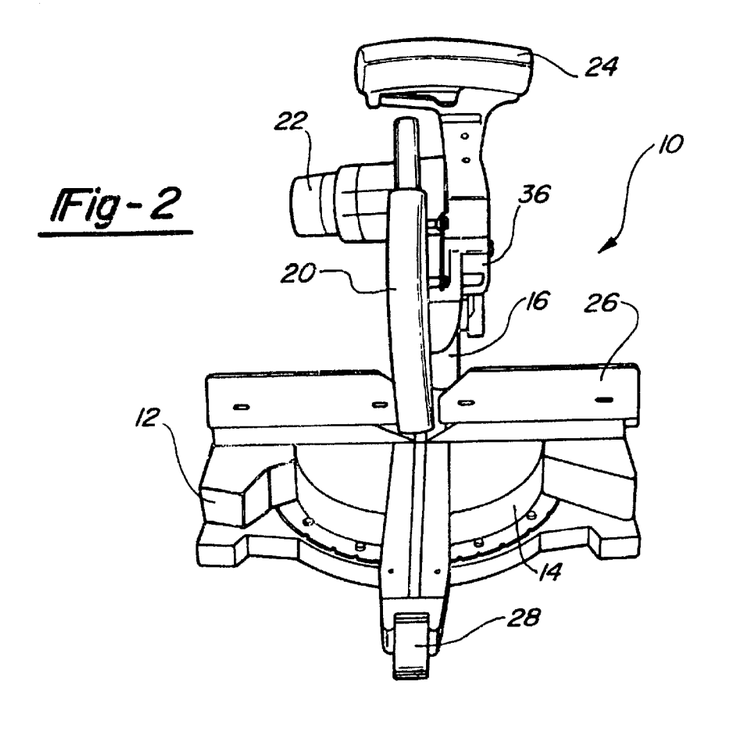
FIG. 2 is a front elevational view of the sliding compound miter saw shown in FIG. 1.
Figures 3, 4:
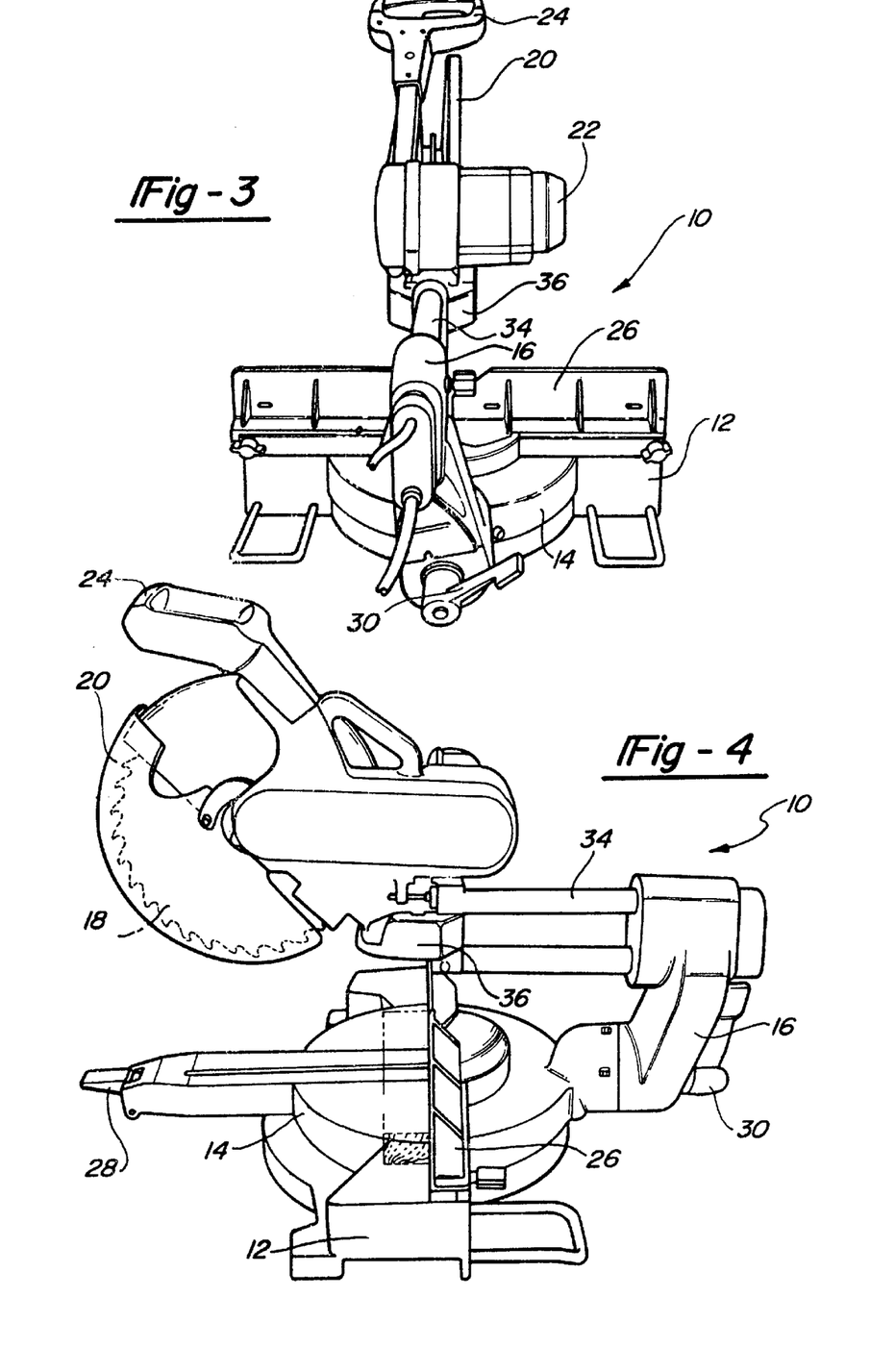
FIG. 3 is a rear elevational view of the sliding compound miter saw shown in FIGS. 1 and 2.
FIG. 4 is a side elevational view of the sliding compound miter saw shown in FIGS. 1 through 3.
Figure 5:
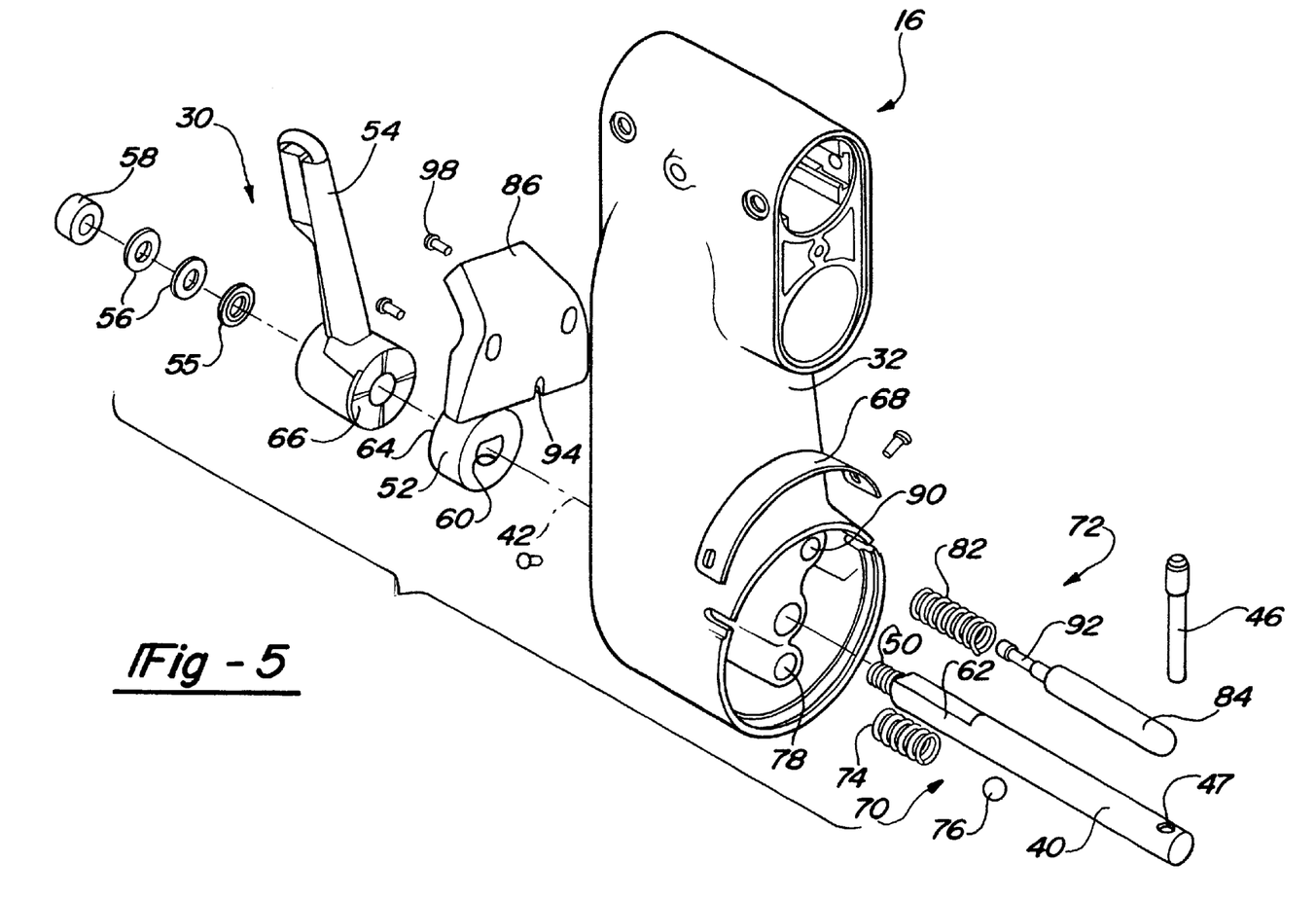
FIG. 5 is an exploded perspective view of the bevel cam locking mechanism in accordance with the present invention.
Figure 6:
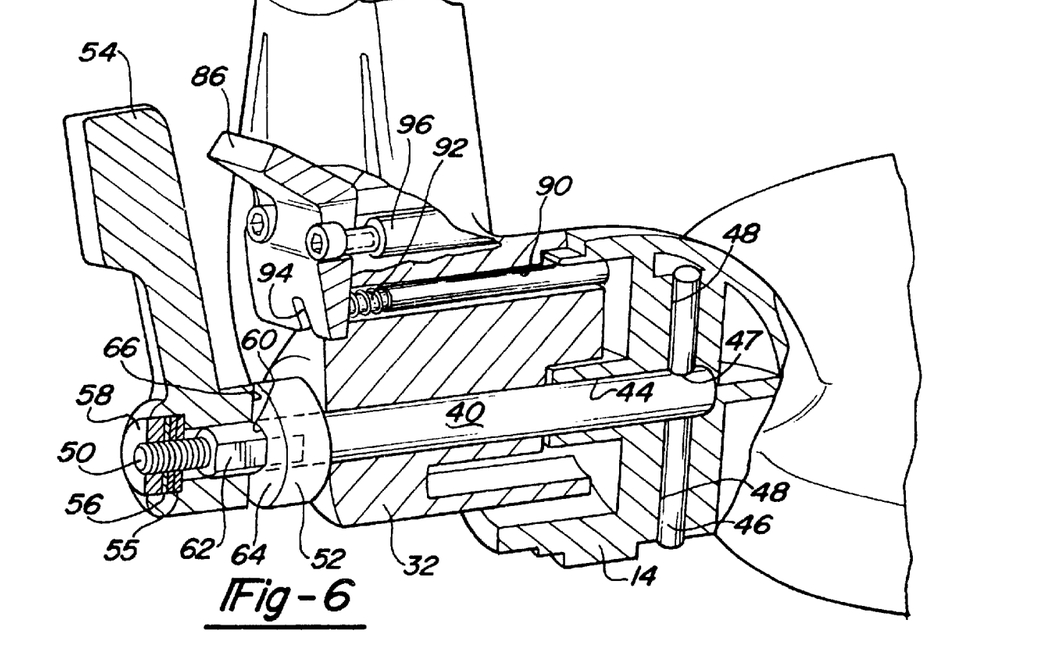
FIG. 6 is an assembled perspective view, partially in cross-section of the bevel cam locking mechanism shown in FIG. 5.
Figure 7:
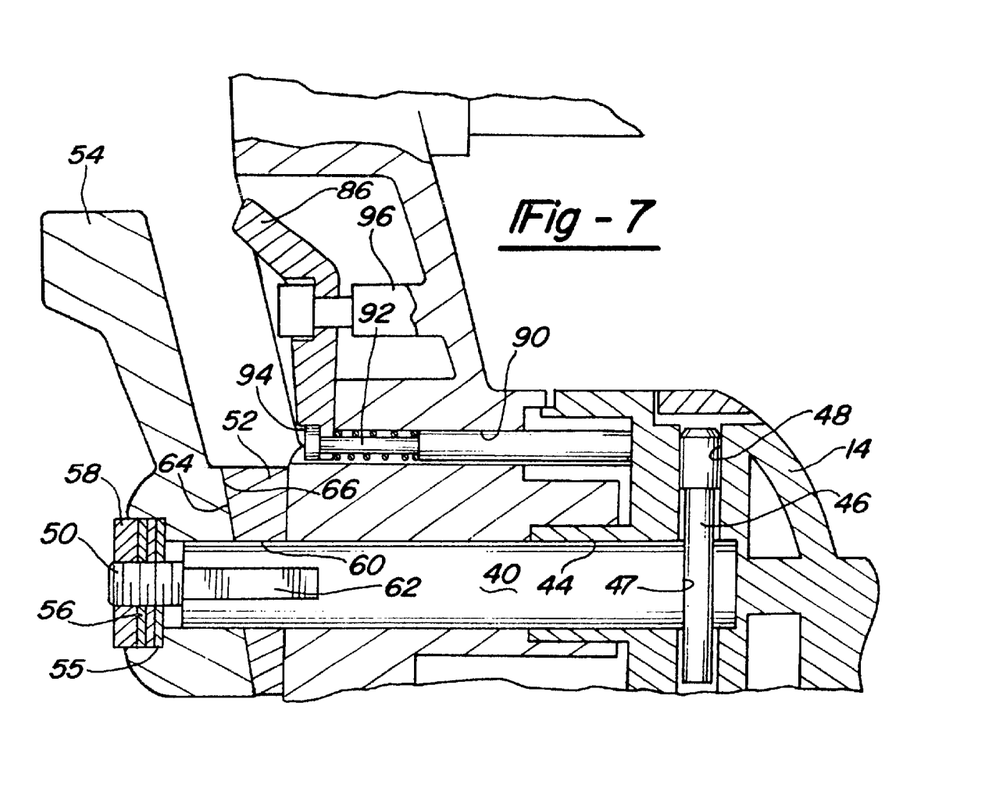
FIG. 7 is a cross-sectional side view of the locking mechanism shown in FIG. 5.

Locking mechanism 30 comprises a cam 52, a handle 54, a thrust bearing 55, a plurality of washers 56 and a locknut 58. Once support housing 32 is slidingly and pivotably received on shaft 40, cam 52 is slidingly positioned on shaft 40 adjacent support housing 32. Cam 52 includes a D-shaped through bore 60 which mates with a corresponding D-shaped portion 62 of shaft 40 such that cam 52 is allowed to move axially along portion 62 of shaft 40 but rotation of cam 52 with respect to shaft 40 is prohibited. Cam 52 further includes an angular camming surface 64 having a plurality of ramps which is located on the radial surface of cam 52 which is opposite to support housing 32. Camming surface 64 is designed to mate with handle 54 as will be described later herein.

Handle 54 is slidingly and rotatably positioned on shaft 40 adjacent to and outboard of cam 52. Handle 54 includes an angular camming surface 66 having a plurality of ramps which mates with angular camming surface 64 on cam 52. Support housing 32, cam 52 and handle 54 are retained on shaft 40 by thrust washer 55, the plurality of washers 56 and locknut 58 which is threadingly received on stub 50 of shaft 40.

When angular camming surface 64 and angular camming surface 66 are in full contact with each other as shown in FIG. 7, support housing 32 is free to pivot on shaft 40 to change the bevel angle of saw blade 18. Once the desired bevel angle has been set, handle 54 is rotated with respect to shaft 40. Rotation of handle 54 mis-aligns camming surfaces 64 and 66 pushing support housing 32 and cam 52 axially along shaft 40. Support housing 32 contacts table assembly 14 and continued rotation of handle 54 forces support housing 32 into table assembly 14 locking the two components together. The locking of the two components together can be accomplished by rotating handle 54 in either a clockwise or a counter clockwise direction on order to misalign camming surfaces 64 and 66. This bi-directional locking ability of handle 54 simplifies the adjustment of the bevel angle on opposite sides of center. An indicator plate 68 is bolted to support housing 32 to allow the user to set a specific bevel angle. Indicator plate 68 is provided with a pair of slots which allow for the zero adjustment of plate 68 as is well known in the art.

The present invention also incorporates two additional features within housing assembly 16. These two features are a detent system 70 and a positive stop system 72. Detent system 70 includes a biasing spring 74 and a ball 76. Biasing spring 74 and ball 76 are inserted into a blind aperture 78 located within support housing 32. The ends of aperture 78 are formed over ball 76 such that ball 76 is retained within aperture 78 while being biased by spring 74 against the formed ends of aperture 78. Table assembly 14 includes a pair of detents 80, FIG. 8, which are formed into the face of table assembly 14. The position of detents 80 are selected such that ball 76 will drop into detent 80 when the bevel angle for support housing 32 reaches 31.62° either side of center. A bevel angle of 31.62° is desired when miter saw 10 is being set to cut cove molding. While the present invention is illustrated as having only one pair of detents 80, it is within the scope of the present invention to provide additional detents located at additional bevel angles which are commonly used if desired.

Positive stop system 72 comprises a biasing spring 82, a stop rod 84, an override button 86 and a plurality of adjustable stops 88. Biasing spring 82 is inserted into a stepped aperture 90 extending through support housing 32 such that it abuts the step formed within aperture 90. Stop rod 84 is then inserted through spring 82 and through aperture 90 trapping spring 82 between rod 84 and stepped aperture 90. A reduced diameter portion 92 of rod 84 extends through housing 32 and is inserted into a slot 94 formed within override button 86. Override button 86 is pivotably secured to a pair of posts 96 formed as a part of housing 32 by a pair of bolts 98. Once secured to posts 96, pivoting movement of button 86 moves stop rod 84 axially within housing 32 between a stop position and a release position with spring 82 biasing stop rod 84 into its stopped position.

Figure 8:
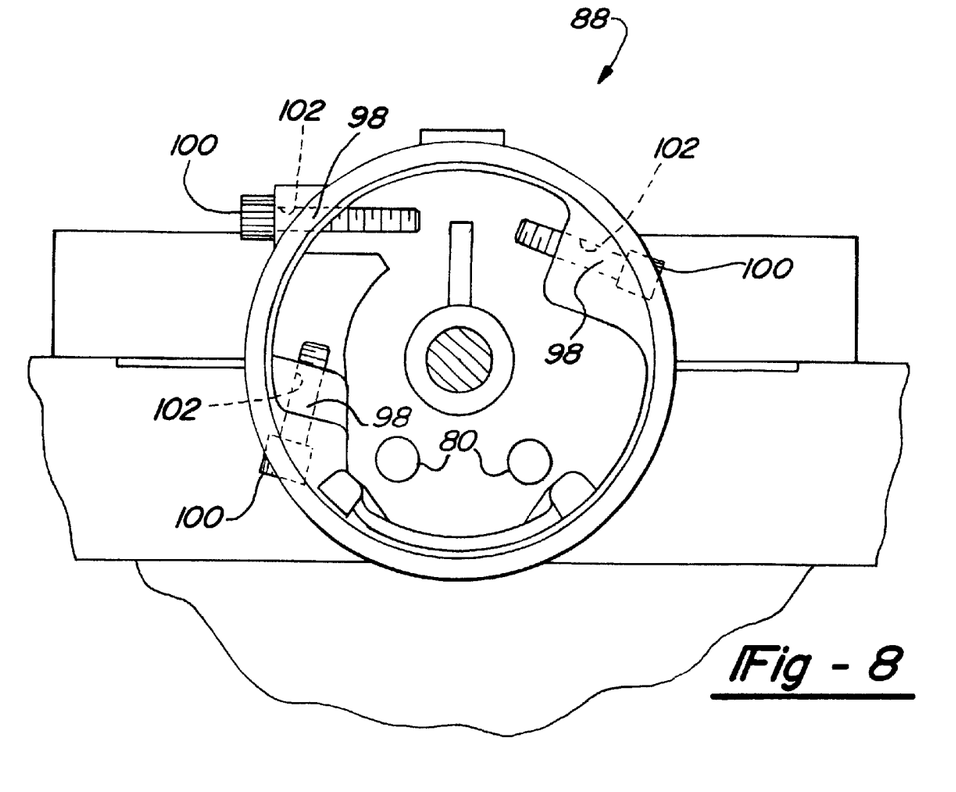
FIG. 8 is a end view of the base or table assembly illustrating the adjustment feature provided for the positive stop.

When located in its stopped position, stop rod 84 extends out of housing 32 and into table assembly 14 such that it can engage one of the plurality of adjustable stops 88 shown in FIG. 8. Table assembly 14 is shown, in the preferred embodiment, having an adjustable stop 88 located at a 0° bevel angle and at a bevel angle of 45° on both sides of center. Each adjustable stop 88 includes a housing 98 and a threaded stop bolt 100. Each housing 98 is shown as an integral part of table assembly 14 but i is within the scope of the present invention to manufacture individual housings 98 and secure them to table assembly 14 if desired. Each housing 98 defines a threaded through bore 102 into which stop bolt 100 is threadably received. Threaded stop bolt 100 provides a surface for stop rod 84 to contact when the bevel angle of housing 32 is located at 0° or ±45° from the 0° bevel angle as is shown in the preferred embodiment. The adjustability of each stop 88 is provided by the threaded connection between bolt 100 and housing 98 and this adjustability allows the operator to accurately set these specific bevel angles. When the bevel angle needs to be changed, handle 54 is rotated to release housing 32 from table assembly 14 and override button 86 is pivoted on posts 96 to withdraw stop rod 84 from within table assembly 14 to a position at which stop rod 84 does not contact bolt 100 or housing 98 when housing 32 is pivoted on shaft 40.

While the above detailed description describes the preferred embodiment of the present invention, it should be understood that the present invention is susceptible to modification, variation and alteration without deviating from the scope and fair meaning of the subjoined claims.

What is claimed is:

1. A device for performing working operations on a workpiece, said device comprising:
   a table defining a horizontal work surface and a bore extending generally parallel to said horizontal work surface;
   a shaft disposed within said bore defined by said table, said shaft extending outwardly from said table generally parallel to said horizontal surface;
   a support housing supporting a motor and a working tool driven by said motor, said support housing being disposed on said shaft adjacent to said table, said support housing and said motor being pivotable around said shaft between a first position where said support housing is generally perpendicular to said horizontal work surface of said table and a second position where said support housing is at an acute angle with respect to said horizontal work surface of said table;
   a detent system disposed between said table and said support housing, said detent system working automatically to releasably secure said support housing to said table such that said support housing is located at a specified angle with respect to said table, said detent system comprising:
   a ball;
   a compression spring disposed between said ball and one of said table and said support housing, said compression spring biasing said ball towards the other end of said table and said support housing; and
   at least one detent defined by the other of said table and said support housing, said ball engaging said detent to releasably secure said support housing at said specified angle.

2. The device according to claim 1 wherein, said support housing is pivotable in both a clockwise and counter-clockwise direction with respect to said shaft.

3. The device according to claim 1 wherein, said at least one detent is a plurality of detents.

4. The device according to claim 3 wherein, said spring and said ball are disposed within a bore defined by said support housing.

5. The device according to claim 4 wherein, said plurality of detents comprises a first and a second detent, said support housing being pivotable in said clockwise direction such that said ball engages said first detent, said support housing being pivotable in said counter-clockwise direction such that said ball engages said second detent.

6. The device according to claim 3 wherein, said plurality of detents comprises a first and a second detent, said support housing being pivotable in said clockwise direction such that said ball engages said first detent, said support housing being pivotable in said counter-clockwise direction such that said ball engages said second detent.

7. The device according to claim 1 wherein, said spring and said ball are disposed within a bore defined by said support housing.

8. The device according to claim 7 wherein, said at least one detent comprises a first and a second detent, said support housing being pivotable in said clockwise direction such that said ball engages said first detent, said support housing being pivotable in said counter-clockwise direction such that said ball engages said second detent.

9. The device according to claim 1 wherein, said at least one detent is a plurality of detents.

10. The device according to claim 9 wherein, said spring and said ball are disposed within a bore defined by said support housing.

11. The device according to claim 10 wherein, said at least one detent comprises a first and a second detent, said support housing being pivotable in said clockwise direction such that said ball engages said first detent, said support housing being pivotable in said counter-clockwise direction such that said ball engages said second detent.

12. The device according to claim 1 wherein, said at least one detent comprises a first and a second detent, said support housing being pivotable in said clockwise direction such that said ball engages said first detent, said support housing being pivotable in said counter-clockwise direction such that said ball engages said second detent.

13. The device according to claim 1 wherein, said spring and said ball are disposed within a bore defined by said support housing.

14. The device according to claim 13 wherein, said at least one detent comprises a first and a second detent, said support housing being pivotable in a clockwise direction such that said ball engages said first detent, said support housing being pivotable in a counter-clockwise direction such that said ball engages said second detent.

15. The device according to claim 1 wherein, said at least one detent comprises a first and a second detent, said support housing being pivotable in a clockwise direction such that said ball engages said first detent, said support housing being pivotable in a counter-clockwise direction such that said ball engages said second detent.

16. A device for performing working operations on a workpiece, said device comprising:

a table defining a horizontal work surface and a bore extending generally parallel to said horizontal work surface;

a shaft disposed within said bore defined by said table, said shaft extending outwardly from said table generally parallel to said horizontal surface;

a support housing supporting a motor and a working tool driven by said motor, said support housing being disposed on said shaft adjacent to said table, said support housing and said motor being pivotable around said shaft between a first position where said support housing is generally perpendicular to said horizontal work surface of said table and a second position where said support housing is at an acute angle with respect to said horizontal work surface of said table;

a detent system disposed between said table and said housing, said detent system working automatically to releasably secure said support housing to said table such that said support housing is located at a specified angle with respect to said table, said detent system comprising:

a pressing member;

a compression spring disposed between said pressing member and one of said table and said support housing, said compression spring biasing said pressing member towards the other of said table and said support housing; and an abutting surface defined by the other of said table and said support housing, said abutting surface having a recess formed therein, said pressing member engaging said recess to releasably secure said support housing at said specified angle.

17. A device for performing working operations on a workpiece, said device comprising:

a base;

a table rotatably disposed on said base, said table defining a horizontal work surface and a bore extending generally parallel to said horizontal work surface;

a shaft disposed within said bore defined by said table, said shaft extending outwardly from said table generally parallel to said horizontal surface;

a support housing supporting a motor and a working tool driven by said motor, said support housing being disposed on said shaft adjacent to said table, said support housing and said motor being pivotable around said shaft between a first position where said support housing is generally perpendicular to said horizontal work surface of said table and a second position where said support housing is at an acute angle with respect to said horizontal work surface of said table; and a detent system disposed between said table and said support housing, said detent system being continuously activated to releasably secure said support housing to said table such that said support housing is located at a specified angle with respect to said table, said detent system comprising:

a ball;

a compression spring disposed between said ball and one of said table and said support housing, said compression spring biasing said ball towards the other end of said table and said support housing; and at least one detent defined by the other of said table and said support housing, said ball engaging said detent to releasably secure said support housing at said specified angle.

18. The device according to claim 1, wherein said specified angle is 90°.

19. The device according to claim 1, wherein said specified angle is 58.38°.

20. The device according to claim 16, wherein said specified angle is 90°.

21. The device according to claim 16, wherein said specified angle is 58.38°.

22. The device according to claim 17, wherein said specified angle is 90°.

23. The device according to claim 17, wherein said specified angle is 58.38°.

* * * * *

UNITED STATES PATENT AND TRADEMARK OFFICE
CERTIFICATE OF CORRECTION

PATENT NO. : 6,606,931 B1  Page 1 of 1
DATED : August 19, 2003
INVENTOR(S) : Mark E. Brunson et al.

It is certified that error appears in the above-identified patent and that said Letters Patent is hereby corrected as shown below:

Column 6,
Lines 8, 25 and 45, "claim 1" should be -- claim 2 --.

Signed and Sealed this

Sixth Day of January, 2004

JAMES E. ROGAN
*Director of the United States Patent and Trademark Office*